(12) United States Patent
Wu et al.

(10) Patent No.: US 11,816,891 B2
(45) Date of Patent: Nov. 14, 2023

(54) VIDEO RECOGNITION METHOD AND APPARATUS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Wenhao Wu, Beijing (CN); Yuxiang Zhao, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 198 days.

(21) Appl. No.: 17/411,254

(22) Filed: Aug. 25, 2021

(65) Prior Publication Data
US 2021/0383128 A1 Dec. 9, 2021

(30) Foreign Application Priority Data
Jan. 21, 2021 (CN) .......................... 202110081599.6

(51) Int. Cl.
G06V 20/40 (2022.01)
(52) U.S. Cl.
CPC .............. G06V 20/41 (2022.01); G06V 20/46 (2022.01); G06V 20/49 (2022.01)
(58) Field of Classification Search
None
See application file for complete search history.

(56) References Cited

U.S. PATENT DOCUMENTS

| | | | | |
|---|---|---|---|---|
| 11,354,906 | B2 * | 6/2022 | Perazzi | ................... G06F 17/15 |
| 2018/0302656 | A1 | 10/2018 | Ekambaram | |
| 2019/0295534 | A1 * | 9/2019 | Wan | ........................ G10L 15/02 |
| 2020/0278218 | A1 * | 9/2020 | Malczyk | .............. G09B 29/007 |
| 2020/0342253 | A1 * | 10/2020 | Li | ........................ G06V 10/82 |
| 2021/0056324 | A1 * | 2/2021 | Chen | ...................... G06V 10/82 |
| 2021/0142066 | A1 * | 5/2021 | Jayaram | ............. H04N 21/2187 |
| 2021/0319232 | A1 * | 10/2021 | Perazzi | ................. G06F 18/253 |

(Continued)

FOREIGN PATENT DOCUMENTS

CN 108833973 A 11/2018
CN 110032926 A 7/2019
(Continued)

OTHER PUBLICATIONS

European Search Report for Application No. EP21202755.1 dated Mar. 24, 2022 (eight (8) pages).
(Continued)

*Primary Examiner* — Santiago Garcia
(74) *Attorney, Agent, or Firm* — KDW Firm PLLC

(57) ABSTRACT

Provided are a video recognition method and apparatus, an electronic device, a medium and a computer program product. The video recognition method is described below. A to-be-recognized video is divided into at least two video segments; video frames are extracted from the at least two video segments, and feature recognition is performed on the video frames to obtain initial semantic feature blocks of the at least two video segments; each of the initial semantic feature blocks is fused, and a fused target semantic feature block is obtained; and a type of the to-be-recognized video is determined according to the fused target semantic feature block.

9 Claims, 4 Drawing Sheets

(56) References Cited

U.S. PATENT DOCUMENTS

| | | | |
|---|---|---|---|
| 2021/0366127 A1* | 11/2021 | Gu | .......................... G06V 40/10 |
| 2022/0051025 A1 | 2/2022 | Li et al. | |
| 2022/0292296 A1* | 9/2022 | Hieida | .................. G01S 13/931 |

FOREIGN PATENT DOCUMENTS

| | | |
|---|---|---|
| CN | 110929622 A | 3/2020 |
| CN | 111274995 A | 6/2020 |
| CN | 111797850 A | 10/2020 |
| CN | 111931679 A | 11/2020 |

OTHER PUBLICATIONS

Chinese Search Report for Application No. 2021100815996dated Jul. 17, 2023.
Chinese Office Action for Application No. 2021100815996dated Jul. 19, 2023.

* cited by examiner

VIDEO RECOGNITION METHOD AND APPARATUS, ELECTRONIC DEVICE AND STORAGE MEDIUM

CROSS-REFERENCE TO RELATED APPLICATION(S)

This application claims priority to Chinese Patent Application No. 202110081599.6 filed Jan. 21, 2021, the disclosure of which is incorporated herein by reference in its entirety.

TECHNICAL FIELD

The present disclosure relates to the field of artificial intelligence, in particular, to technologies of computer vision and deep learning, and specifically, to a video recognition method and apparatus, an electronic device, a storage medium and a computer program product.

BACKGROUND

Video recognition refers to that a video is input and classified according to the content of the video. Video recognition is one of the most concerned topics in the computer vision community, which is attributed to the huge application potential of video recognition in video surveillance, video recommendation and retrieval.

SUMMARY

The present disclosure provides a video recognition method and apparatus, an electronic device, a storage medium and a computer program product.

According to an aspect of the present disclosure, a video recognition method is provided. The method includes steps described below.

A to-be-recognized video is divided into at least two video segments.

Video frames are extracted from the at least two video segments, and feature recognition is performed on the video frames to obtain initial semantic feature blocks of the at least two video segments.

Each of the initial semantic feature blocks is fused, and a fused target semantic feature block is obtained.

A type of the to-be-recognized video is determined according to the fused target semantic feature block.

According to another aspect of the present disclosure, a video recognition apparatus is provided. The apparatus includes a segmentation module, a feature recognition module, a fusion module and a recognition module.

The segmentation module is configured to divide a to-be-recognized video into at least two video segments.

The feature recognition module is configured to extract video frames from the at least two video segments and perform feature recognition on the video frames to obtain initial semantic feature blocks of the at least two video segments.

The fusion module is configured to fuse each of the initial semantic feature blocks and obtain a fused target semantic feature block.

The recognition module is configured to determine, according to the fused target semantic feature block, a type of the to-be-recognized video.

According to another aspect of the present disclosure, an electronic device is provided. The electronic device includes at least one processor and a memory.

The memory is communicatively connected to the at least one processor.

The memory stores instructions executable by the at least one processor, and the instructions are executed by the at least one processor to cause the at least one processor to execute the video recognition method of any one of embodiments of the present disclosure.

According to another aspect of the present disclosure, a non-transitory computer-readable storage medium is provided. The storage medium stores computer instructions for causing a computer to execute the video recognition method of any one of the embodiments of the present disclosure.

According to another aspect of the present disclosure, a computer program product is provided. The computer program product includes a computer program which, when executed by a processor, implements the video recognition method of any one of the embodiments of the present disclosure.

According to the technology of the present disclosure, the accuracy of video recognition is improved.

It is to be understood that the content described in this part is neither intended to identify key or important features of the embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Example embodiments of the present disclosure, including details of the embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, description of well-known functions and constructions is omitted hereinafter for clarity and conciseness.

At present, the commonly used video recognition method is to extract a fixed number of video frames (for example, 10 frames) from a to-be-recognized video at even or random intervals, and input the fixed number of video frames into the network for recognition. In order to improve the accuracy of video recognition, the commonly used method purely considers the design of the feature extraction network, that is, manually designs a recognition network of a certain structure, so that the network may obtain higher accuracy. However, since medium and long videos (such as videos having a duration of more than 1 minute) mainly contain video blocks having multiple semantemes, if a fixed number of video frames are still extracted for recognition, semantic associations and differences between different video segments will be ignored. Moreover, the situation where video frames used for expressing a certain piece of semantics are not extracted exists, which results in insufficient extracted features and affects the accuracy of video recognition, and this lost accuracy cannot be compensated for by designing the structure of the feature extraction network. Based on this, the inventor creatively proposed a video recognition method for medium and long videos.

Figure 1:
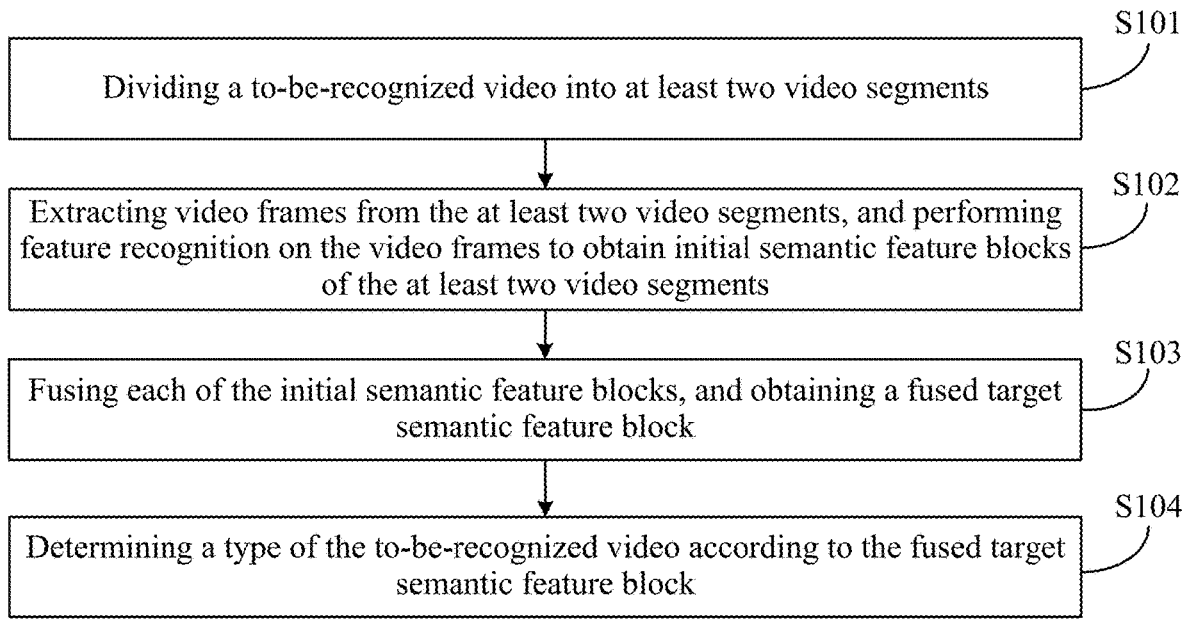
FIG. 1 is a diagram showing a video recognition method according to an embodiment of the present disclosure.

FIG. 1 is a flowchart of a video recognition method according to an embodiment of the present disclosure. The embodiment is applicable to the situation where a server and other devices fuse the feature of each extracted video segment, and then perform video recognition according to the fused feature. The method may be executed by a video recognition apparatus. The apparatus is implemented by software and/or hardware and is integrated in an electronic device, for example, integrated in a server.

Specifically, referring to FIG. 1, the video recognition method includes steps described below.

In step S101, a to-be-recognized video is divided into at least two video segments.

The to-be-recognized video is a medium or long video, for example, a video having a duration of more than 1 minute. In an optional implementation, the step in which a to-be-recognized video is divided into at least two video segments includes: average segmentation is performed on the to-be-recognized video, and at least two video segments having the same length are obtained. Exemplarily, if the duration of the to-be-recognized video is 10 minutes and the preset duration of each video segment is 20 seconds, the to-be-recognized video is divided into 30 video segments having a duration of 20 seconds. It should be noted that the to-be-recognized video may also be divided into segments in other manners, which is not specifically limited herein. The average segmentation is selected since the average segmentation can ensure the efficiency of video division.

In step S102, video frames are extracted from the at least two video segments, and feature recognition is performed on the video frames to obtain initial semantic feature blocks of the at least two video segments.

In the embodiment of the present disclosure, for any video segment, video frames are extracted from the video segment, and feature recognition is performed on the video frames to obtain initial semantic feature blocks of the video segment. It should be noted that the number of initial semantic feature blocks obtained through step S102 is the same as the number of video segments obtained through step S101; moreover, video frames are extracted from each video segment for feature recognition, so that the situation where video frames expressing a certain piece of semantics are not extracted may be avoided.

Further, different video segments may include the same semantics, so that if two or more adjacent video segments include the same semantics, video frames may be extracted from any one of the two or more video segments for feature recognition.

In step S103, each of the initial semantic feature blocks is fused, and a fused target semantic feature block is obtained.

In an optional implementation, the step in which each of the initial semantic feature blocks is fused, and a fused target semantic feature block is obtained includes: feature information of different channels of the each of the initial semantic feature blocks is fused according to a dynamic movement strategy, and the fused target semantic feature block is obtained, where the number of target semantic feature blocks obtained through feature fusion is the same as the number of initial semantic feature blocks obtained through step S102. It should be noted that the feature information of different channels of the each of initial semantic feature blocks is fused, so that the purpose of different initial semantic feature blocks containing part of information of other initial semantic feature blocks adjacent to the initial semantic feature blocks in time sequence is achieved, and thus semantic associations and differences between different video segments can be determined according to each fused target semantic feature block.

In step S104, a type of the to-be-recognized video is determined according to the fused target semantic feature block.

In the embodiment of the present disclosure, long semantic information of the to-be-recognized video can be determined according to the fused target semantic feature block, and the type of the to-be-recognized video is determined according to the long semantic information.

In the embodiment of the present disclosure, in consideration of semantic differences contained in different segments in the video, the feature of each extracted video segment is fused, and then recognition is performed according to the fused feature, which can improve the accuracy of video recognition.

Figure 2:
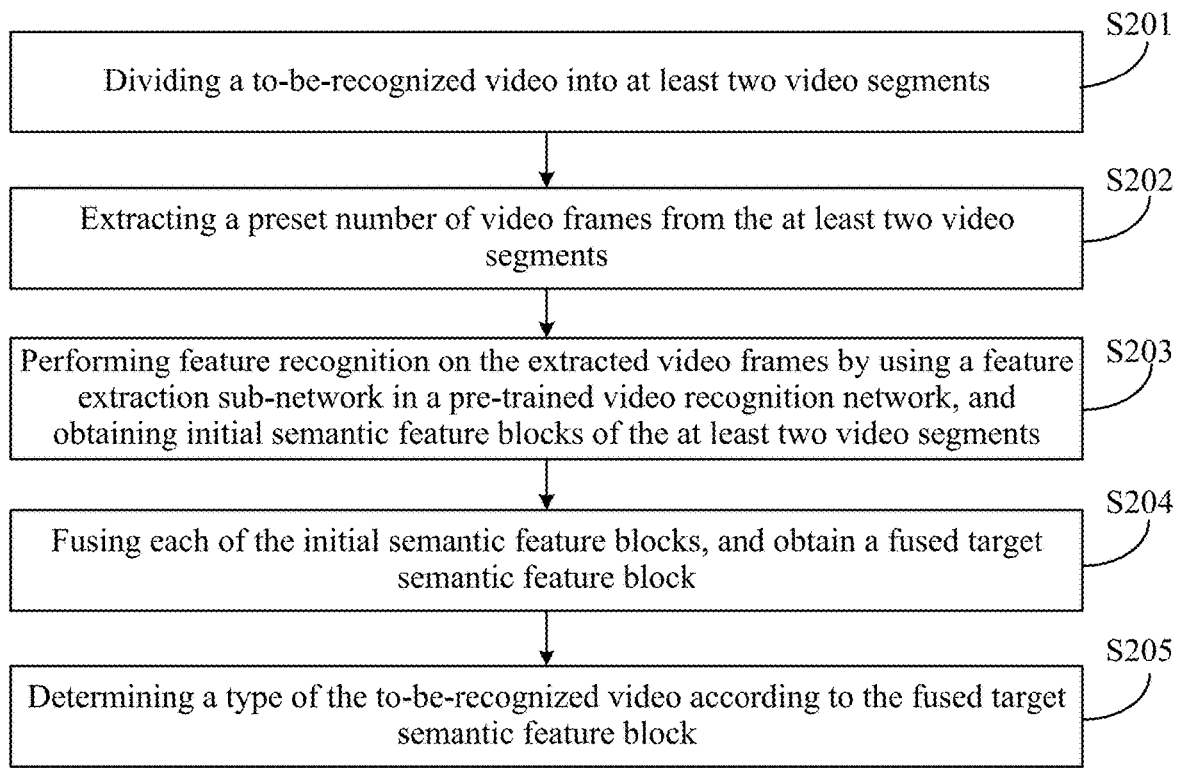
FIG. 2 is a diagram showing a video recognition method according to an embodiment of the present disclosure.

FIG. 2 is a flowchart of a video recognition method according to an embodiment of the present disclosure. This embodiment is an optimization on the basis of the above embodiment. Referring to FIG. 2, the video recognition method specifically includes steps described below.

In step S201, a to-be-recognized video is divided into at least two video segments.

In step S202, a preset number of video frames are extracted from the at least two video segments.

In the embodiment of the present disclosure, video frames are extracted from each video segment, for example, at preset time intervals, so as to facilitate subsequent feature recognition and feature fusion. It should be noted that in the related art, a fixed-input manner is used for video recognition, that is, during video recognition, a fixed number of video frames (for example, 10 frames) are extracted from the video and input to a video recognition network. In the present disclosure, a preset number of video frames (for example, 8 frames) are extracted from each video segment, so that a relatively large number of video frames are extracted, more features are obtained, and higher accuracy of subsequent recognition is ensured.

In step S203, feature recognition is performed on the extracted video frames by using a feature extraction sub-network in a pre-trained video recognition network, and initial semantic feature blocks of the at least two video segments are obtained.

In step S204, each of the initial semantic feature blocks is fused, and a fused target semantic feature block is obtained.

In step S205, a type of the to-be-recognized video is determined according to the fused target semantic feature block.

In the embodiment of the present disclosure, compared with the related art, a fusion module is further added to the pre-trained video recognition network for fusing the feature blocks extracted by the feature extraction sub-network. It should be noted that if the video recognition network includes multiple layers of feature extraction sub-networks, a dynamic fusion module is added to each layer of feature extraction sub-network. Therefore, when features are extracted, operations of extracting features and fusing features are executed in sequence according to the levels of feature extraction, and then a video recognition result is output according to the final extracted feature blocks.

In the embodiment of the present disclosure, the process of training the video recognition network is described below. A video image sequence and a real tag corresponding to the video are input, the video is evenly divided into several video segments according to length, and 8 frames of images are collected from each video segment at even intervals. Then, features are extracted through the feature extraction network, and information is fused through the fusion module. After multilayer information extraction through the network, the most likely type of the video is predicted by using a fully connected layer. Then, the prediction result and the real tag are calculated by using a cross entropy loss function, the loss is optimized by using a stochastic gradient descent method, and the network weight layer is continuously updated and the training of the loss function stops until the convergence is reached.

Further, after the training is over, the trained video recognition network needs to be tested. For example, a video is input and evenly divided into several segments (larger than the trained video segment), and 8 frames are collected from each segment. Part of frames are evenly sampled and input into the overall network, prediction results are aggregated, and then the prediction result of the video can be directly obtained.

In the embodiment of the present disclosure, video frames are extracted from each video segment, thereby ensuring that sufficient features are obtained; and a fusion module is added to the video recognition network, so that the feature of each extracted video segment can be fused. Therefore, video recognition may be performed according to the fused feature, and the accuracy of video recognition is improved.

Figure 3A:
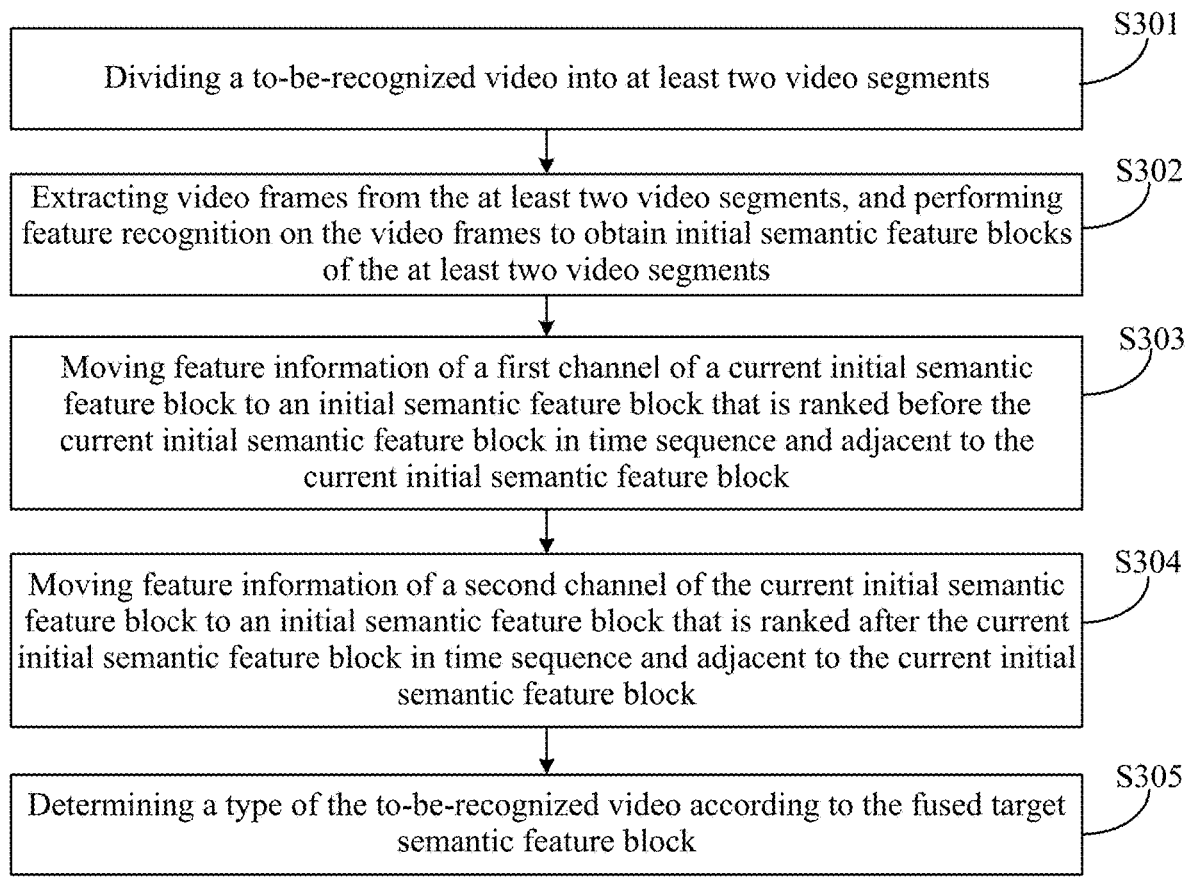
FIG. 3A is a diagram showing a video recognition method according to an embodiment of the present disclosure.

FIG. 3A is a flowchart of a video recognition method according to an embodiment of the present disclosure. This embodiment is an optimization on the basis of the above embodiment. Referring to FIG. 3A, the video recognition method specifically includes steps described below.

In step S301, a to-be-recognized video is divided into at least two video segments.

In step S302, video frames are extracted from the at least two video segments, and feature recognition is performed on the video frames to obtain initial semantic feature blocks of the at least two video segments.

In step S303, feature information of a first channel of a current initial semantic feature block is moved to an initial semantic feature block that is ranked before the current initial semantic feature block in time sequence and adjacent to the current initial semantic feature block.

In step S304, feature information of a second channel of the current initial semantic feature block is moved to an initial semantic feature block that is ranked after the current initial semantic feature block in time sequence and adjacent to the current initial semantic feature block.

Through the fusion operations of steps S303 to S304, a fused target semantic feature block is obtained.

In step S305, a type of the to-be-recognized video is determined according to the fused target semantic feature block.

Figure 3B:
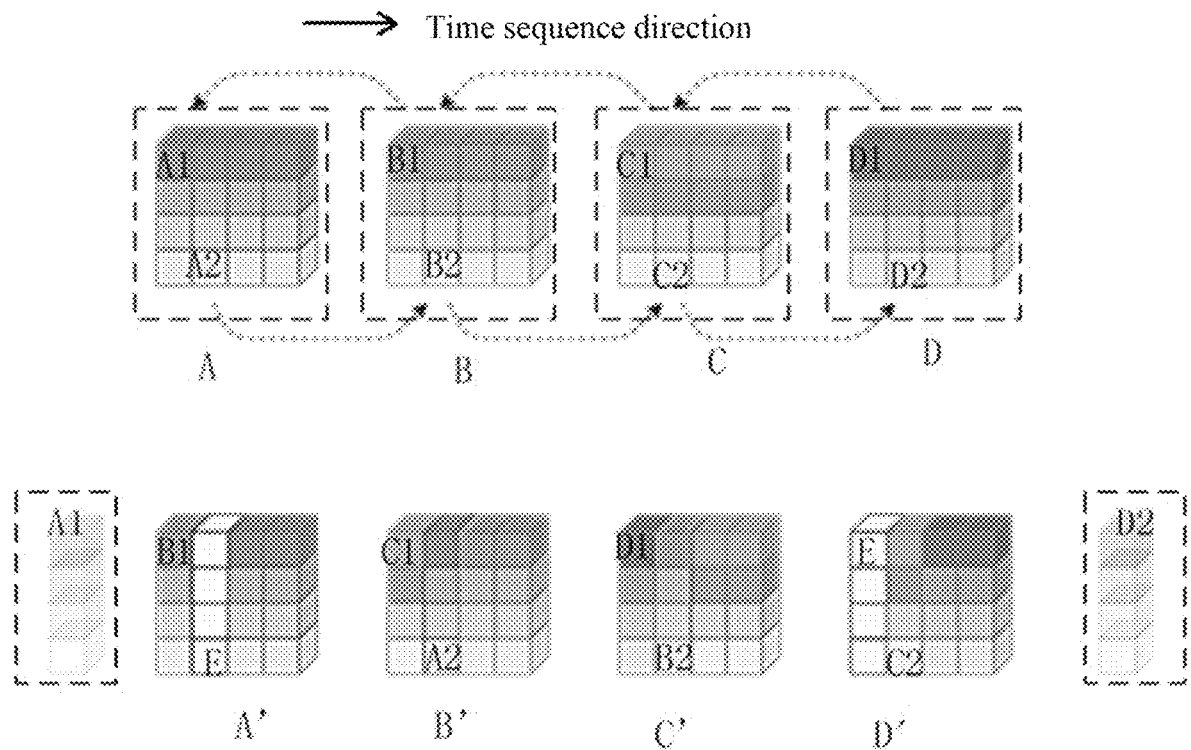
FIG. 3B is a diagram showing a fusion process of initial semantic feature blocks according to an embodiment of the present disclosure.

Exemplarily, referring to FIG. 3B, FIG. 3B is a diagram showing a fusion process of initial semantic feature blocks. A to-be-recognized video is divided into four video segments, frames are extracted from the four video segments, and feature recognition is performed on the extracted frames to obtain initial semantic feature blocks A, B, C and D arranged in time sequence. In the initial semantic feature block A, the column where A1 is located is the first channel of the initial semantic feature block A, and the column where A2 is located is the second channel of the initial semantic feature block A; similarly, the column where B1 is located is the first channel of the initial semantic feature block B, and the column where B2 is located is the second channel of the initial semantic feature block B; the column where C1 is located is the first channel of the initial semantic feature block C, and the column where C2 is located is the second channel of the initial semantic feature block C; the column where D1 is located is the first channel of the initial semantic feature block D, and the column where D2 is located is the second channel of the initial semantic feature block D.

If the current initial semantic feature block is the initial semantic feature block B and feature fusion is performed according to steps S303 to S304, the feature information of the first channel (that is, the column where B1 is located) of the initial semantic feature block B is moved forward to the initial semantic feature block A; and the feature information of the second channel (that is, the column where B2 is located) of the initial semantic feature block B is moved backward to the initial semantic feature block C. Similarly, other feature blocks are fused according to the above manner.

It should be noted that if the current initial semantic feature block is the initial semantic feature block A ranked first in time sequence, the feature information of the first channel (that is, the column where A1 is located) of the initial semantic feature block A can be directly deleted. Moreover, since the feature information of the second channel (that is, the column where A2 is located) of the initial semantic feature block A is moved to the initial semantic feature block B, it is necessary to fill the second channel of the current initial semantic feature block A with information, such as zero padding, and the information newly filled with is the column where E is located.

If the current initial semantic feature block is the initial semantic feature block D ranked last in time sequence, the feature information of the second channel (that is, the column where D2 is located) of the initial semantic feature block D can be directly deleted; the first channel of the current initial semantic feature block D is filled with information, and the information newly filled with is the column where E is located. In the embodiment of the present disclosure, the semantic feature blocks are filled, so that the structure of each fused semantic feature block can be ensured to be the same, which is convenient for the subsequent feature extraction and fusion.

Through the above process, fused target semantic feature blocks A', B', C' and D' can be obtained, and then the type of the video can be determined according to the target semantic feature blocks A', B', C' and D'.

In the embodiment of the present disclosure, the fusion of information of different channels of each feature block is achieved through the dynamic movement manner, and each fused feature block contains part of information of other feature blocks connected to the each fused feature block. Therefore, time domain information is introduced into each feature block, and long time domain semantic information of the to-be-recognized video can be accurately obtained according to the fused feature blocks, thus the video is classified according to the long time domain semantic information, and the accuracy of semantic classification can be improved.

Figure 4:
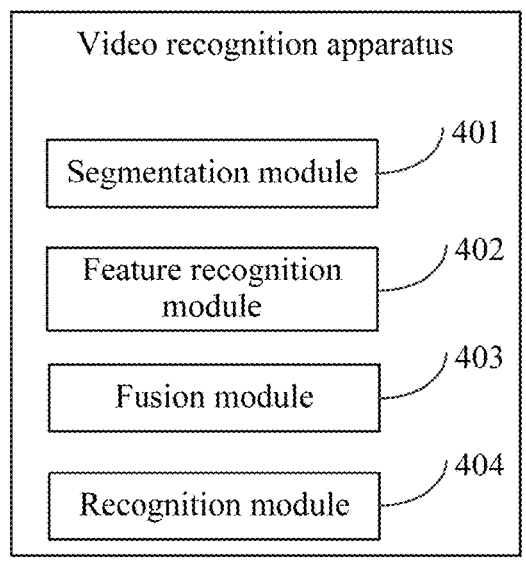
FIG. 4 is a schematic diagram of a video recognition apparatus according to an embodiment of the present disclosure.

FIG. 4 is a schematic diagram of a video recognition apparatus according to an embodiment of the present disclosure. The embodiment is applicable to the situation where features of extracted video segments are fused, and then video recognition is performed according to fused features. As shown in FIG. 4, the apparatus specifically includes a segmentation module 401, a feature recognition module 402, a fusion module 403 and a recognition module 404.

The segmentation module 401 is configured to divide a to-be-recognized video into at least two video segments.

The feature recognition module 402 is configured to extract video frames from the at least two video segments and perform feature recognition on the video frames to obtain initial semantic feature blocks of the at least two video segments.

The fusion module 403 is configured to fuse each of the initial semantic feature blocks and obtain a fused target semantic feature block.

The recognition module 404 is configured to determine, according to the fused target semantic feature block, a type of the to-be-recognized video.

Based on the above embodiment, optionally, the fusion module includes a dynamic fusion unit.

The dynamic fusion unit is configured to fuse, according to a dynamic movement strategy, feature information of different channels of the each of the initial semantic feature blocks and obtain the fused target semantic feature block.

Based on the above embodiment, optionally, the dynamic fusion unit includes a forward moving subunit and a backward moving subunit.

The forward moving subunit is configured to move feature information of a first channel of a current initial semantic feature block to an initial semantic feature block that is ranked before the current initial semantic feature block in time sequence and adjacent to the current initial semantic feature block.

The backward moving subunit is configured to move feature information of a second channel of the current initial semantic feature block to an initial semantic feature block that is ranked after the current initial semantic feature block in time sequence and adjacent to the current initial semantic feature block.

On the basis of the preceding embodiments, optionally, a first filling module or a second filling module is included.

The first filling module is configured to in response to the current initial semantic feature block being an initial semantic feature block ranked first in time sequence, fill the second channel of the current initial semantic feature block with information.

The second filling module is configured to in response to the current initial semantic feature block being an initial semantic feature block ranked last in time sequence, fill the first channel of the current initial semantic feature block with information.

Based on the above embodiment, optionally, the feature recognition module includes a frame extraction unit and a feature recognition unit.

The frame extraction unit is configured to extract a preset number of video frames from the at least two video segments.

The feature recognition unit is configured to perform the feature recognition on the extracted video frames by using a feature extraction sub-network in a pre-trained video recognition network, and obtain the initial semantic feature blocks of the at least two video segments.

Based on the preceding embodiment, optionally, the segmentation module is configured to perform average segmentation on the to-be-recognized video, and obtain at least two video segments having the same length.

The video recognition apparatus provided by the embodiment of the present disclosure may execute the video recognition method of any one of the embodiments of the present disclosure, and have functional modules and beneficial effects corresponding to the executed method. For content not described in detail in the embodiment, reference can be made to description in any method embodiment of the present disclosure.

According to the embodiments of the present disclosure, the present disclosure further provides an electronic device, a readable storage medium and a computer program product.

Figure 5:
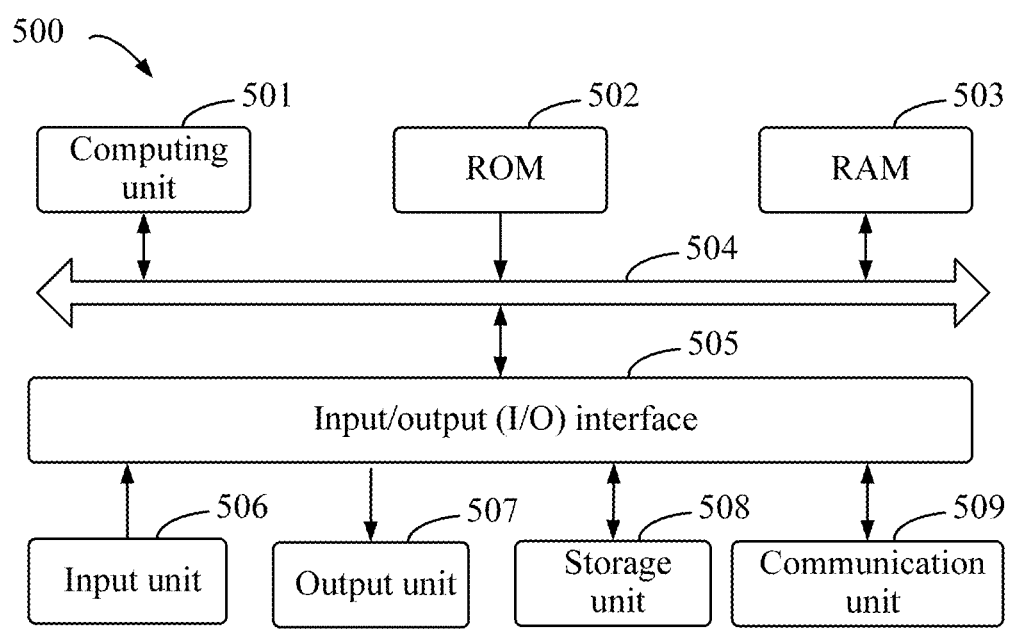
FIG. 5 is a block diagram of an electronic device for implementing a video recognition method according to an embodiment of the present disclosure.

FIG. 5 a block diagram showing an exemplary electronic device 500 that may be used for implementing the embodiments of the present disclosure. Electronic devices are intended to represent various forms of digital computers, for example, laptop computers, desktop computers, worktables, personal digital assistants, servers, blade servers, mainframe computers and other applicable computers. Electronic devices may also represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various appropriate actions and processing according to a computer program stored in a read-only memory (ROM) 502 or a computer program loaded into a random-access memory (RAM) 503 from a storage unit 508. The RAM 503 may also store various programs and data required for operations of the device 500. The computing unit 501, the ROM 502 and the RAM 503 are connected to each other by a bus 504. An input/output (I/O) interface 505 is also connected to the bus 504.

Multiple components in the device 500 are connected to the I/O interface 505. The multiple components include an input unit 506 such as a keyboard or a mouse, an output unit 507 such as various types of displays or speakers, the storage unit 508 such as a magnetic disk or an optical disk, and a communication unit 509 such as a network card, a modem or a wireless communication transceiver. The communication unit 509 allows the device 500 to exchange information/data with other devices over a computer network such as the Internet and/or over various telecommunication networks.

The computing unit 501 may be a general-purpose and/or special-purpose processing component having processing and computing capabilities. Some examples of the computing unit 501 include, but are not limited to, central processing units (CPUs), graphics processing units (GPUs), various special-purpose artificial intelligence (AI) computing chips, various computing units running machine learning models and algorithms, digital signal processors (DSPs) and any suitable processors, controllers and microcontrollers. The computing unit 501 executes various methods and processing described above, such as the video recognition method. For example, in some embodiments, the video recognition method may be implemented as computer software programs tangibly contained in a machine-readable medium such as the storage unit 508. In some embodiments, part or all of computer programs may be loaded and/or installed on the device 500 via the ROM 502 and/or the communication unit 509. When the computer programs are loaded to the RAM 503 and executed by the computing unit 501, one or more steps of the above video recognition method may be performed. Alternatively, in other embodiments, the computing unit 501 may be configured, in any other suitable manner (for example, by means of firmware), to execute the video recognition method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), and computer hardware, firmware, software and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus and at least one output apparatus and transmitting data and instructions to the memory system, the at least one input apparatus and the at least one output apparatus.

Program codes for implementation of the method of the present disclosure may be written in any combination of one or more programming languages. These program codes may be provided for a processor or controller of a general-purpose computer, a special-purpose computer or another programmable data processing apparatus such that the program codes, when executed by the processor or controller, cause functions/operations specified in the flowcharts and/or block diagrams to be implemented. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that contains or stores a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

In order that interaction with a user is provided, the systems and techniques described herein may be implemented on a computer. The computer has a display apparatus (for example, a cathode-ray tube (CRT) or liquid-crystal display (LCD) monitor) for displaying information to the user; and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a block-chain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS) service.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure are within the scope of the present disclosure.

What is claimed is:

1. A video recognition method, comprising:
   dividing a to-be-recognized video into at least two video segments;
   extracting video frames from the at least two video segments, and performing feature recognition on the video frames to obtain initial semantic feature blocks of the at least two video segments;
   fusing each of the initial semantic feature blocks, and obtaining a fused target semantic feature block; and
   determining, according to the fused target semantic feature block, a type of the to-be-recognized video;
   wherein the fusing the obtained initial semantic feature blocks, and obtaining the fused target semantic feature block comprises: fusing, according to a dynamic movement strategy, feature information of different channels of the each of the initial semantic feature blocks, and obtaining the fused target semantic feature block;

wherein the fusing, according to the dynamic movement strategy, the feature information of the different channels of the each of the initial semantic feature blocks comprises:

moving feature information of a first channel of a current initial semantic feature block to an initial semantic feature block that is ranked before the current initial semantic feature block in time sequence and adjacent to the current initial semantic feature block; and moving feature information of a second channel of the current initial semantic feature block to an initial semantic feature block that is ranked after the current initial semantic feature block in time sequence and adjacent to the current initial semantic feature block.

2. The method according to claim 1, further comprising:

in response to the current initial semantic feature block being an initial semantic feature block ranked first in time sequence, filling the second channel of the current initial semantic feature block with information; or in response to the current initial semantic feature block being an initial semantic feature block ranked last in time sequence, filling the first channel of the current initial semantic feature block with information.

3. The method according to claim 1, wherein the extracting the video frames from the at least two video segments and performing the feature recognition on the video frames to obtain the initial semantic feature blocks of the at least two video segments comprises:

extracting a preset number of video frames from the at least two video segments; and performing the feature recognition on the extracted video frames by using a feature extraction sub-network in a pre-trained video recognition network, and obtaining the initial semantic feature blocks of the at least two video segments.

4. The method according to claim 1, wherein the dividing the to-be-recognized video into the at least two video segments comprises:

performing average segmentation on the to-be-recognized video, and obtaining at least two video segments having a same length.

5. An electronic device, comprising:

at least one processor; and a memory communicatively connected to the at least one processor; wherein the memory stores instructions executable by the at least one processor, and the instructions are executed by the at least one processor to cause the at least one processor to perform:

dividing a to-be-recognized video into at least two video segments;

extracting video frames from the at least two video segments, and performing feature recognition on the video frames to obtain initial semantic feature blocks of the at least two video segments;

fusing each of the initial semantic feature blocks, and obtaining a fused target semantic feature block; and determining, according to the fused target semantic feature block, a type of the to-be-recognized video;

wherein the fusing the obtained initial semantic feature blocks, and obtaining the fused target semantic feature block comprises: fusing, according to a dynamic movement strategy, feature information of different channels of the each of the initial semantic feature blocks, and obtaining the fused target semantic feature block;

wherein the fusing, according to the dynamic movement strategy, the feature information of the different channels of the each of the initial semantic feature blocks comprises:

moving feature information of a first channel of a current initial semantic feature block to an initial semantic feature block that is ranked before the current initial semantic feature block in time sequence and adjacent to the current initial semantic feature block; and moving feature information of a second channel of the current initial semantic feature block to an initial semantic feature block that is ranked after the current initial semantic feature block in time sequence and adjacent to the current initial semantic feature block.

6. The electronic device according to claim 5, further comprising:

in response to the current initial semantic feature block being an initial semantic feature block ranked first in time sequence, filling the second channel of the current initial semantic feature block with information; or in response to the current initial semantic feature block being an initial semantic feature block ranked last in time sequence, filling the first channel of the current initial semantic feature block with information.

7. The electronic device according to claim 5, wherein the extracting the video frames from the at least two video segments and performing the feature recognition on the video frames to obtain the initial semantic feature blocks of the at least two video segments comprises:

extracting a preset number of video frames from the at least two video segments; and performing the feature recognition on the extracted video frames by using a feature extraction sub-network in a pre-trained video recognition network, and obtaining the initial semantic feature blocks of the at least two video segments.

8. The electronic device according to claim 5, wherein the dividing the to-be-recognized video into the at least two video segments comprises:

performing average segmentation on the to-be-recognized video, and obtaining at least two video segments having a same length.

9. A non-transitory computer-readable storage medium storing computer instructions for causing a computer to execute the method of claim 1.

* * * * *